US008841820B2

(12) United States Patent
Bennett et al.

(10) Patent No.: US 8,841,820 B2
(45) Date of Patent: Sep. 23, 2014

(54) SYNTHETIC JET APPARATUS

(75) Inventors: Grover Bennett, Schenectady, NY (US);
Matthew Boespflug, Clifton Park, NY (US); Seyed Saddoughi, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 236 days.

(21) Appl. No.: 13/187,965

(22) Filed: Jul. 21, 2011

(65) Prior Publication Data
US 2013/0020403 A1 Jan. 24, 2013

(51) Int. Cl.
*H01L 41/09* (2006.01)

(52) U.S. Cl.
USPC ............. 310/328; 310/331; 310/332; 417/53; 417/413.2

(58) Field of Classification Search
USPC .......................................... 310/328, 330–332
See application file for complete search history.

(56) References Cited

U.S. PATENT DOCUMENTS

| 4,697,989 | A | * | 10/1987 | Perlov et al. ..................... 417/53 |
| 4,939,405 | A | * | 7/1990 | Okuyama et al. ............. 310/330 |
| 5,192,197 | A | * | 3/1993 | Culp .............................. 417/322 |
| 5,267,841 | A | * | 12/1993 | Culp et al. ..................... 417/322 |
| 5,889,354 | A | * | 3/1999 | Sager ............................. 310/331 |
| 6,074,178 | A | * | 6/2000 | Bishop et al. ................. 417/322 |
| 6,262,519 | B1 | * | 7/2001 | Furlani et al. ................. 310/358 |
| 6,889,567 | B2 | * | 5/2005 | Cabuz ......................... 73/863.23 |
| 2003/0075615 | A1 | | 4/2003 | Saddoughi |
| 2005/0001514 | A1 | | 1/2005 | Takeuchi et al. |
| 2006/0185822 | A1 | | 8/2006 | Glezer et al. |
| 2007/0152104 | A1 | | 7/2007 | Cueman et al. |
| 2007/0243084 | A1 | * | 10/2007 | Vogeley ...................... 417/413.2 |
| 2007/0295481 | A1 | * | 12/2007 | Campbell et al. ............ 165/80.4 |
| 2008/0087771 | A1 | | 4/2008 | Boespflug et al. |
| 2011/0147476 | A1 | | 6/2011 | Saddoughi et al. |
| 2011/0158822 | A1 | * | 6/2011 | Bartels ............................ 417/53 |
| 2012/0138704 | A1 | * | 6/2012 | Saddoughi et al. ......... 239/102.2 |

FOREIGN PATENT DOCUMENTS

| JP | 3-222878 | A | * | 10/1991 | .................... 417/322 |
| JP | 6-147104 | A | * | 5/1994 | ................. 417/413.2 |

* cited by examiner

*Primary Examiner* — Thomas Dougherty
(74) *Attorney, Agent, or Firm* — Reising Ethington P.C.; John J. Snyder

(57) ABSTRACT

A synthetic jet apparatus including a series of generally parallel spaced-apart bimorph piezoelectric plates defining first and second sets of fluid chambers. The chambers of the second set of fluid chambers are interleaved with the chambers of the first set of fluid chambers. The first and second sets of fluid chambers are in fluid communication with sources of first and second fluids, respectively, the source of the first fluid being separate from the source of the second fluid. The bimorph plates are operable to alternately draw the first fluid from its source into the first set of fluid chambers while expelling the second fluid from the second set of fluid chambers, and then expel the first fluid from the first set of fluid chambers back into its source while drawing the second fluid from its source into the second set of fluid chambers.

9 Claims, 2 Drawing Sheets

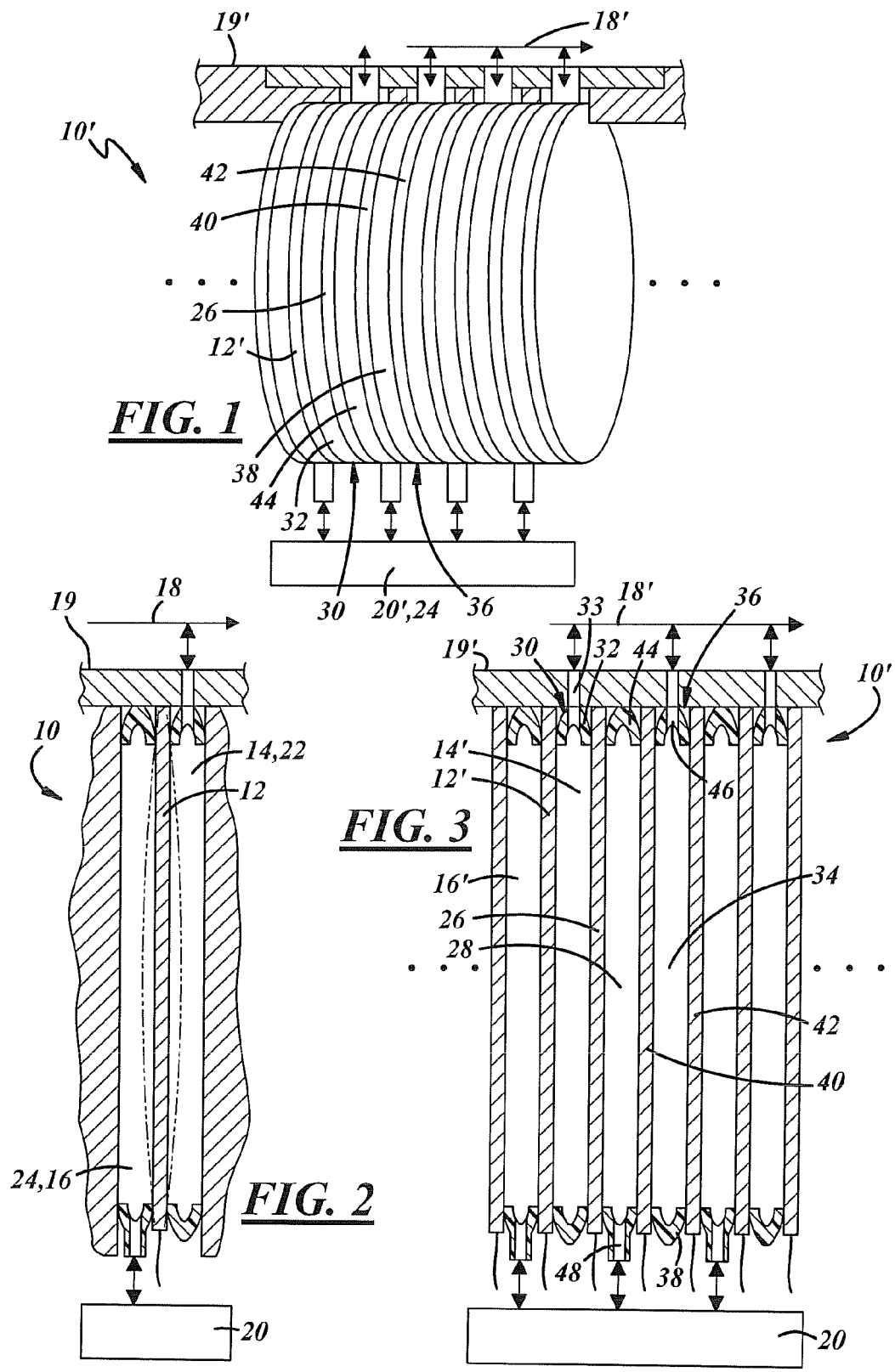

SYNTHETIC JET APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to synthetic jets and, more specifically, synthetic jets that interact with working fluids at temperatures outside an optimum working temperature range of the synthetic jets.

2. Description of the Related Art Including Information Disclosed Under 37 CFR 1.97 and 1.98

Synthetic jets are known for use in pulsing jets of fluid into a flow of working fluid such as hot jet engine exhaust gases. One type of synthetic jet used for this purpose is a dual bimorph synthetic jet (DBSJ), which comprises a working fluid chamber defined by two dual bimorph piezoelectric plates spaced apart by a flexible spacer ring hinge. A working fluid port provides fluid flow communication between the working fluid chamber and a flow of working fluid. The plates include respective bimorph piezoelectric structures arranged to alternately expand convexly away from one another and concavely toward one another in response to applications of voltage of alternating polarity. Convex expansion of the bimorph piezoelectric structures away from one another increases the volume of the working fluid chamber and draws working fluid into the working fluid chamber. Concave expansion of the structures toward one another decreases the volume of the working fluid chamber and expels working fluid from the working fluid chamber through the working fluid port. However, the piezoceramics in DBSJs generally limit the use of DBSJs to relatively low temperature environments.

Distributed synthetic jet actuators are known to have been used in a thermal management system for a heat-producing body. The synthetic jet actuators are arranged to remove heat energy from a heat-producing body by moving coolant working fluid past the body in close proximity.

Synthetic jets are also known to have been arranged in a series or "stack" comprising a plurality of bimorph plates arranged in a parallel spaced-apart fashion to define intervening synthetic jet working fluid chambers that are in fluid communication with a flow of working fluid. In this type of arrangement the bimorph plates are actuated in an alternating fashion to produce alternating pulses of working fluid. In other words, working fluid is being expelled from every other chamber while fluid is being drawn into all the intervening chambers, and vice versa.

BRIEF SUMMARY OF THE DISCLOSURE

A synthetic jet apparatus is provided comprising a bimorph piezoelectric plate separating first and second fluid chambers and configured to alternately increase and decrease the volumes of the first and second fluid chambers by alternately bowing toward the first then the second chamber in response to application of voltages of alternating polarity across the plate. The first fluid chamber is configured to communicate in fluid flow with a source of a first fluid, and a second fluid chamber is configured to communicate in fluid flow with a source of second fluid such that alternate actuation of the bimorph plate to bow in one direction and then the other causes the first and second fluids to be alternately drawn into and expelled from the respective first and second fluid chambers out-of-phase.

A second bimorph piezoelectric plate may be positioned to separate a third fluid chamber from the first fluid chamber and may be configured to alternately increase and decrease the volumes of the first and third fluid chambers by alternately bowing toward the first then the third chamber in opposition to the first plate in response to application of voltages of alternating polarity across the plate. The third fluid chamber may be configured to communicate in fluid flow with the source of the second fluid such that alternate actuation of the second bimorph plate to bow in one direction and then the other causes the first and second fluids to be alternately drawn into and expelled from the respective first and third fluid chambers out-of-phase.

A first synthetic jet assembly of the apparatus may comprise a first hinge connecting the first and second plates to each other and cooperating with the plates to define the first fluid chamber. The first hinge may comprise a first fluid port configured to provide fluid flow communication between the first fluid chamber and the source of the first fluid.

A second synthetic jet assembly of the apparatus may comprise a second hinge connecting third and fourth bimorph piezoelectric plates to each other and cooperating with those plates to define a fourth fluid chamber. The second hinge may comprise a second fluid port configured to provide fluid flow communication between the fourth fluid chamber and the source of the first fluid. A third hinge may connect the second plate of the first jet assembly and the first plate of the second jet assembly, cooperating with the second plate of the first jet assembly and the first plate of the second jet assembly to define the second fluid chamber. The third hinge may comprise a third fluid port configured to provide fluid flow communication between the third fluid chamber and the source of the second fluid.

The first fluid chamber may be a working fluid chamber configured to be coupled to a working fluid passage and to communicate in fluid flow with working fluid moving through the working fluid passage, and the second fluid chamber may be a heat transfer fluid chamber configured to communicate in fluid flow with a source of heat transfer fluid having temperature cooler than that of the working fluid such that alternate actuation of the bimorph plate to bow in one direction and then the other causes the working and heat transfer fluids to be alternately drawn into and expelled from the respective working fluid and cooling fluid chambers out-of-phase.

The synthetic jet apparatus may alternatively be described as comprising a series of spaced-apart bimorph piezoelectric plates defining first and second sets of fluid chambers. The second set of fluid chambers may be distributed between every other chamber of the first set of fluid chambers. The first set of fluid chambers may be configured to be in fluid communication with a source of a first fluid and the second set of fluid chambers may be configured to be coupled in fluid flow communication with a source of a second fluid separate from the source of the first fluid. The bimorph plates may be operable to alternately draw the first fluid from its source into the first set of fluid chambers while expelling the second fluid from the second set of fluid chambers, and then expel the first fluid from the first set of fluid chambers back into its source while drawing the second fluid from its source into the second set of fluid chambers.

The first set of fluid chambers may comprise working fluid chambers coupled to a working fluid passage and in fluid flow communication with a flow of relatively hot working fluid moving through the working fluid passage. The second set of fluid chambers may comprise heat transfer fluid chambers coupled to a source of heat transfer fluid and in fluid flow communication with heat transfer fluid from the source of heat transfer fluid having a temperature lower than that of the working fluid.

Alternatively, the heat transfer fluid chambers may be coupled to a heat transfer fluid reservoir and may be in fluid flow communication with heat transfer fluid occupying the reservoir.

In addition, a synthetic jet apparatus is provided comprising a first dual bimorph synthetic jet assembly, a second dual bimorph synthetic jet assembly, and a hinge coupling the first and second dual bimorph synthetic jet assemblies. The hinge at least partially forms a heat transfer chamber between the first and second dual bimorph synthetic jet assemblies, which may be in fluid communication with a source of heat transfer fluid. The dual bimorph synthetic jet assemblies include working fluid chambers that are disposed on opposite sides of the heat transfer chamber and may be in fluid communication with a source of working fluid.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 1 is a schematic front orthogonal view of a synthetic jet apparatus comprising a plurality of synthetic jet assemblies arranged in series;

FIG. 2 is a schematic cross-sectional front view of a single synthetic jet apparatus comprising a single synthetic jet assembly and showing a working fluid chamber and a heat exchange fluid chamber of the apparatus separated by a dual bimorph piezoelectric plate;

FIG. 3 is a schematic cross-sectional front view of the synthetic jet apparatus of FIG. 1 showing alternating working fluid and heat exchange fluid chambers of the apparatus separated by dual bimorph piezoelectric plates;

DETAILED DESCRIPTION OF INVENTION EMBODIMENT(S)

Figure 4:
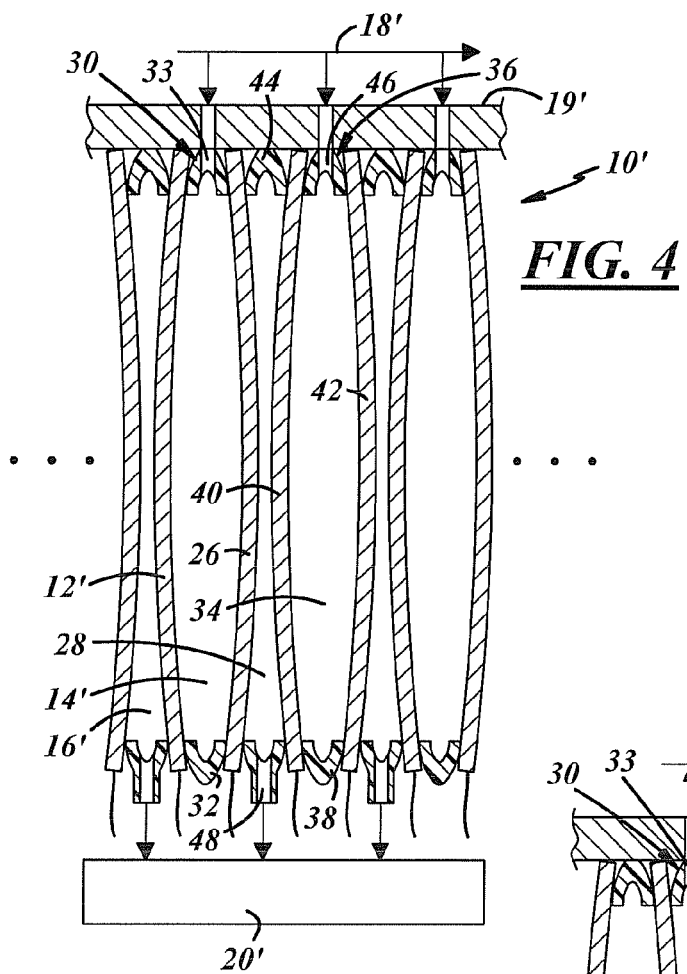
FIG. 4 is a schematic cross-sectional front view of the synthetic jet apparatus of FIGS. 1 and 3 showing the working fluid chambers increased in volume and the heat exchange fluid chambers decreased in volume by deflection of the dual bimorph piezoelectric plates.

A first embodiment of a thermal management device for synthetic jets interacting with working fluids at temperatures outside an optimum working temperature range of the synthetic jets is generally shown at 10 in FIG. 2, while a second embodiment is generally shown at 10' in FIGS. 1, 3, 4, and 5.

Reference numerals with the designation prime (') in FIGS. 1, 3, 4, and 5 indicate alternative configurations of elements that also appear in the first embodiment. Unless indicated otherwise, where a portion of the following description uses a reference numeral to refer to FIG. 2, that portion of the description applies equally to elements designated by primed numerals in FIGS. 1, 3, 4, and 5.

According to the first embodiment, and as shown in FIG. 2, the device 10 may include a first bimorph piezoelectric plate 12 that separates first and second fluid chambers 14, 16 and that is configured to alternately increase and decrease the volumes of the first and second fluid chambers 14, 16 by alternately bowing toward the first fluid chamber 14 then the second fluid chamber 16 in response to application of voltages of alternating polarity across the plate 12. In other words, the bimorph plate 12 may be alternately expanded convexly toward the first chamber 14 (concavely away from the second chamber 16), then concavely away from the first chamber 14 (convexly toward the second chamber 16) in response to the application of voltages of alternating polarity, such that fluid is alternately drawn into and expelled from the first 14 and second 16 fluid chambers out-of-phase. The first fluid chamber 14 may be configured to communicate in fluid flow with a first source of fluid 18, and the second fluid chamber 16 may be configured to communicate in fluid flow with a second source of fluid 20 such that alternate actuation of the bimorph plate 12 to bow in one direction and then the other causes first and second fluids 18, 20 to be alternately drawn into and expelled from the respective first and second fluid chambers 14, 16 out-of-phase.

Figure 5:
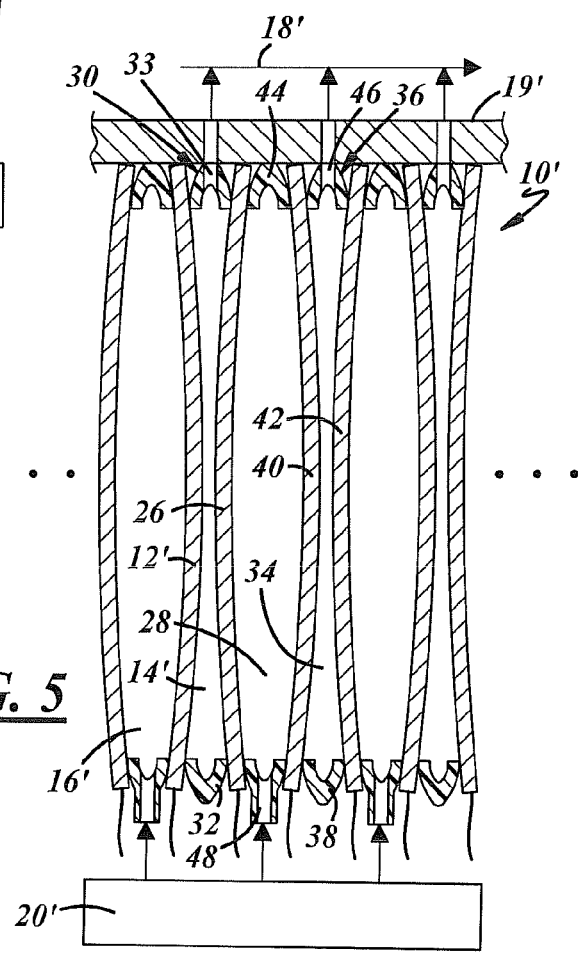
FIG. 5 is a schematic cross-sectional front view of the synthetic jet apparatus of FIGS. 1, 3, and 4 showing the working fluid chambers decreased in volume and the heat exchange fluid chambers increased in volume by deflection of the dual bimorph piezoelectric plates in respective directions opposite those shown in FIG. 4.

In the second embodiment, and as best shown in FIGS. 3, 4, and 5, a second bimorph piezoelectric plate 26 may separate a third fluid chamber 28 from a first fluid chamber 14' and may be configured to alternately increase and decrease the volumes of the first and third fluid chambers 14', 28 by alternately bowing toward the first fluid chamber 14' then the third fluid chamber 28 in response to the application of voltages of alternating polarity across the second plate 26. In other words, the second bimorph plate 26 may be alternately expanded convexly toward the first chamber 14' and concavely away from the third chamber 28, then concavely away from the first chamber 14' and convexly toward the third chamber 28 in opposition to the first plate 12' and in response to application of voltages of alternating polarity such that fluid is alternately drawn into and expelled from the first and third fluid chambers 14', 28 out-of-phase. The third fluid chamber 28 may be configured to communicate in fluid flow with the second source of fluid 20' such that alternate actuation of the second bimorph plate 26 to bow in one direction and then the other causes the first and second fluids 18', 20' to be alternately drawn into and expelled from the respective first and third fluid chambers 14', 28 out-of-phase.

The device 10' may include a first synthetic jet assembly, as is generally indicated at 30 in FIGS. 1 and 3-5, that comprises the first and second bimorph plates 12', 26 and the first, second, and third fluid chambers 14', 16', 28. The first synthetic jet assembly 30 may also include a marginal circumferential flexible first hinge 32 connecting the first and second plates 12', 26 to each other and cooperating with the plates 12', 26 to define the first fluid chamber 12'. The first hinge 32 may comprise a first fluid port 33 configured to provide fluid flow communication between the first fluid chamber 14' and the first source of fluid 18' (e.g., a source of working fluid). In other embodiments, the first hinge 32 may comprise two or more ports configured to provide fluid flow communication between the first fluid chamber 14' and the first source of fluid 18'.

The device 10' may also include a second synthetic jet assembly, as is generally indicated at 36 in FIGS. 1, and 3-5, that comprises third and fourth bimorph piezoelectric plates 40, 42 and a marginal circumferential flexible second hinge 38 connecting the third and fourth bimorph piezoelectric plates 40, 42 to each other and cooperating with those plates to define a fourth fluid chamber 34. The second hinge 38 may comprise a second working fluid port 46 configured to provide fluid flow communication between the fourth fluid chamber 34 and the first source 18' of fluid (e.g., a source of working fluid). The device 10' may also comprise a third marginal circumferential flexible hinge 44 connecting the second plate 26 of the first jet assembly 30 and the third plate of the second jet assembly and cooperating with the second plate 26 of the first jet assembly and the third plate 40 of the second jet assembly to define the third fluid chamber 28 (e.g., a heat exchange fluid chamber) between the first and second synthetic jet assemblies 30, 36. The third hinge 44 may comprise a third fluid 48 configured to provide fluid flow communication between the third fluid chamber 28 and the second source of fluid 20' (e.g., a heat exchange fluid source).

As best shown in FIGS. 4 and 5, the first and fourth fluid chambers 14, 34 may be working fluid chambers configured to communicate in fluid flow with relatively hot working fluid 18' coming from the first fluid source which, in this case, is a mass of hot working fluid 18' passing through a working fluid passage 19' (such as a jet engine exhaust nozzle or afterburner/augmenter section) and having a temperature above an optimum operating temperature range for piezoceramic elements of the bimorph piezoelectric plates 12', 26, 40, 42. The second and third fluid chambers 16', 28 may be heat transfer fluid chambers configured to communicate in fluid flow with fluid 20' that comes from the second fluid source and that may have a temperature cooler than that of the working fluid 18' as well as being below the optimum operating temperature range for the piezoceramic elements of the second bimorph plate 26. Accordingly, the second bimorph plate 26 may bow in one direction and then the other, causing the working and heat transfer fluids 18', 20' to be alternately drawn into and expelled from the respective working fluid chambers 14', 34 and cooling fluid chambers 16', 28 out-of-phase. As shown in FIGS. 1, 3, 4, and 5, any number of synthetic jet assemblies (30, 36 . . . ) may be connected together in this manner, with intervening heat transfer fluid chambers (16', 28 . . . ) in fluid communication with one or more sources of heat transfer fluid 20' and with working fluid chambers (14', 34 . . . ) of the synthetic jet assemblies (30, 36 . . . ) in fluid communication with the first source of working fluid 18' (e.g., in a ring surrounding the inner circumference of a jet engine exhaust nozzle, where the working fluid 18' is the jet exhaust).

The device 10' may alternatively be described as a synthetic jet thermal management system comprising a series of generally parallel spaced-apart bimorph piezoelectric plates (12', 26, 40, 42 . . . ) defining first and second sets (14', 34 . . . ), (16', 28 . . . ) of fluid chambers. The second set of fluid chambers (16', 28 . . . ) may be distributed amongst the chambers of the first set of fluid chambers (14', 34 . . . ). In other words, the chambers of the second set of fluid chambers (16', 28 . . . ) may be interleaved with the chambers of the first set of fluid chambers (14', 34 . . . ). The first set of fluid chambers (14', 34 . . . ) may be configured to be in fluid communication with working fluid 18' from the first fluid source, and the second set of fluid chambers (16', 28 . . . ) may be configured to be coupled in fluid flow communication with fluid 20' from the second fluid source, which is separate from the first fluid source. The bimorph plates may be operable to alternately draw fluid 18' from the first fluid source into the first set of fluid chambers (14', 34 . . . ) while expelling fluid 20' from the second set of fluid chambers (16', 28 . . . ), and then expel fluid 18' from the first set of fluid chambers (14', 34 . . . ) back into the source of the first fluid 18' while drawing fluid 20' from the second fluid source into the second set of fluid chambers (16, 28 . . . ). This arrangement could be repeated for an array of considerable length.

The first set of fluid chambers (14', 34 . . . ) may comprise working fluid chambers coupled to a working fluid passage 19' and in fluid flow communication with relatively hot working fluid 18' moving through the working fluid passage 19'. The second set of fluid chambers (16', 28 . . . ) may comprise heat transfer fluid chambers that are in fluid flow communication with heat transfer fluid 20' from the source of such fluid, where the heat transfer fluid 20' has a temperature lower than that of both the working fluid 18' and the optimum operating temperature range of the bimorph piezoelectric plates (12', 26, 40, 42 . . . ). This allows for the exchange of heat transfer fluid 20' between the heat transfer fluid chambers (16', 28 . . . ) and the source of heat transfer fluid 20', which transfers heat energy that piezoceramic elements of the bimorph plates (12', 26, 40, 42 . . . ) have acquired from the working fluid 18'. Alternatively, where working fluid or ambient temperatures are low enough to lower the temperature of the bimorph piezoelectric elements of the bimorph plates (12', 26, 40, 42 . . . ) below their optimum operational temperature range, the temperature of the heat transfer fluid 20' may be maintained at a level high enough to maintain the bimorph piezoelectric elements within that range. To be high enough to maintain the bimorph piezoelectric elements within their optimum operational temperature range, a minimum temperature at which the heat transfer fluid 20' must be maintained would be material dependant, e.g., 0° C.

The heat transfer fluid chambers (16', 28 . . . ) may be coupled to the source of heat transfer fluid 20' and in fluid flow communication with heat transfer fluid 20' occupying the source. Although the present embodiments contemplate a single source of heat transfer fluid 20', other embodiments may include any number of such sources. Also, in other embodiments, the source or sources of heat transfer fluid 20' may comprise any suitable source of heat transfer fluid to include one or more reservoirs and/or one or more constant fresh supplies of heat transfer fluid 20' provided from sources other than reservoirs.

Additional details of the construction and operation of the bimorph synthetic jets described above may be as disclosed in U.S. patent application Ser. No. 12/960,962; which was filed Dec. 6, 2010; is assigned to the assignee of the present invention; and is incorporated herein by reference. Additional details of the construction and operation of the piezoelectric plate structures of the bimorph synthetic jets may be as disclosed in U.S. Pat. Nos. 6,722,581; 7,055,329; and U.S. Patent Publication Serial No. 20030075615; all of which are assigned to General Electric Company and are incorporated by reference herein in their entireties.

The apparatus described above allows for an increase in the temperature of working fluid with which bimorph synthetic jets can interact without exceeding an optimum operating temperature range of their piezoceramic elements. The apparatus also allows for a decrease in ambient temperature in which bimorph synthetic jets can operate without dropping below the optimum operating temperature range of their piezoceramic elements. The apparatus also minimizes the complexity and additional materials required to provide cooling functions to synthetic jet arrays; an important advantage when operating under strict weight and volume limitations.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A synthetic jet apparatus comprising:
a bimorph piezoelectric plate separating first and second fluid chambers and configured to alternately increase and decrease the volumes of the first and second fluid chambers by alternately bowing toward the first fluid chamber and then the second fluid chamber in response to application of voltages of alternating polarity across the plate, the first fluid chamber being configured to communicate in fluid flow with a source of a first fluid, and the second fluid chamber being configured to communicate in fluid flow with a source of a second fluid such that alternate actuation of the bimorph plate to bow in one direction and then in another direction causes the first and second fluids to be alternately drawn into and expelled from the respective first and second fluid chambers out-of-phase;
a second bimorph piezoelectric plate separating a third fluid chamber from the first fluid chamber and configured to alternately increase and decrease the volumes of the first and third fluid chambers by alternately bowing toward the first then the third chamber in opposition to the first plate and in response to application of voltages of alternating polarity across the plate, the third fluid chamber being configured to communicate in fluid flow with the second source of fluid such that alternate actuation of the second bimorph plate to bow in one direction and then the other causes the first and second fluids to be alternately drawn into and expelled from the respective first and third fluid chambers out-of-phase; and
a first synthetic jet assembly comprising a first hinge connecting the first and second plates to each other and cooperating with the plates to define the first fluid chamber, the first hinge comprising a first fluid port configured to provide fluid flow communication between the first fluid chamber and the first source of fluid.

2. A synthetic jet apparatus as defined in claim 1 in which the apparatus includes:
a second synthetic jet assembly comprising a second hinge connecting third and fourth bimorph piezoelectric plates to each other and cooperating with those plates to define a fourth fluid chamber, the second hinge comprising a second fluid port configured to provide fluid flow communication between the fourth fluid chamber and the first source of fluid; and
a third hinge connecting the second plate of the first jet assembly and the first plate of the second jet assembly and cooperating with the second plate of the first jet assembly and the first plate of the second jet assembly to define the second fluid chamber, the third hinge comprising a third fluid port configured to provide fluid flow communication between the third fluid chamber and the second source of fluid.

3. A synthetic jet apparatus as defined in claim 1 in which:
the first fluid chamber is a working fluid chamber coupled to a working fluid passage and configured to communicate in fluid flow with working fluid that is flowing through the working fluid passage;
the apparatus includes a heat transfer fluid reservoir; and
the second fluid chamber is a heat transfer fluid chamber coupled to the heat transfer fluid reservoir and configured to communicate with the heat transfer fluid chamber via flow of heat transfer fluid having a temperature cooler than that of the working fluid such that alternate actuation of the bimorph plate to bow in one direction and then the other causes the working and heat transfer fluids to be alternately drawn into and expelled from the respective working fluid and cooling fluid chambers out-of-phase.

4. A synthetic jet apparatus comprising a series of spaced-apart bimorph piezoelectric plates defining first and second sets of fluid chambers, the second set of fluid chambers being interleaved with the first set of fluid chambers, the first set of fluid chambers being configured to be in fluid communication with a source of a first fluid, the second set of fluid chambers being configured to be coupled in fluid flow communication with a source of a second fluid separate from the source of the first fluid, the bimorph plates being operable to alternately draw the first fluid from its source into the first set of fluid chambers while expelling the second fluid from the second set of fluid chambers, and then expel the first fluid from the first set of fluid chambers back into the source of the first fluid while drawing the second fluid from its source into the second set of fluid chambers.

5. A synthetic jet apparatus as defined in claim 4 in which:
the first set of fluid chambers comprises working fluid chambers coupled to a working fluid passage and in fluid flow communication with a flow of working fluid moving through the working fluid passage; and
the second set of fluid chambers comprises heat transfer fluid chambers coupled to a source of heat transfer fluid and in fluid flow communication with heat transfer fluid from the source of heat transfer fluid having a temperature lower than that of the working fluid.

6. A synthetic jet apparatus as defined in claim 5 in which the heat transfer fluid chambers are coupled to a heat transfer fluid reservoir and in fluid flow communication with heat transfer fluid occupying the reservoir.

7. A synthetic jet apparatus comprising:
a first dual bimorph synthetic jet assembly;
a second dual bimorph synthetic jet assembly;
a hinge coupling the first and second dual bimorph synthetic jet assemblies and at least partially forming a heat transfer chamber between the first and second dual bimorph synthetic jet assemblies.

8. The apparatus of claim 7, in which the first and second dual bimorph synthetic jet assemblies include working fluid chambers disposed on opposite sides of the heat transfer chamber.

9. The apparatus of claim 7, in which the working fluid chambers of the first and second dual bimorph synthetic jet assemblies are in fluid communication with a source of working fluid and the heat transfer chamber is in fluid communication with a source of heat transfer fluid separate from the source of working fluid.

* * * * *